(12) United States Patent  (10) Patent No.: US 8,661,806 B2
Hendrickson  (45) Date of Patent: Mar. 4, 2014

(54) ADAPTIVE, LOW-IMPACT VEHICLE ENERGY HARVESTER

(75) Inventor: Brian S. Hendrickson, Boston, MA (US)

(73) Assignee: Kinetic Energy Corporation, Washington, DC (US)

( * ) Notice: Subject to any disclaimer, the term of this patent is extended or adjusted under 35 U.S.C. 154(b) by 780 days.

(21) Appl. No.: 12/626,858

(22) Filed: Nov. 27, 2009

(65) Prior Publication Data

US 2010/0192561 A1  Aug. 5, 2010

Related U.S. Application Data

(60) Provisional application No. 61/118,339, filed on Nov. 26, 2008, provisional application No. 61/118,334, filed on Nov. 26, 2008.

(51) Int. Cl.
 *F16D 31/02* (2006.01)
(52) U.S. Cl.
 USPC ............................................. 60/398; 60/413
(58) Field of Classification Search
 USPC ...................... 60/398, 413; 290/1 R; 417/229
 See application file for complete search history.

(56) References Cited

U.S. PATENT DOCUMENTS

| | | | |
|---|---|---|---|
| 1,312,131 A | 8/1919 | Morton | |
| 1,771,200 A | 7/1930 | Akers | |
| 1,916,873 A | 7/1933 | Wiggins | |
| 3,748,443 A | 7/1973 | Kroll et al. | |
| 3,859,589 A | 1/1975 | Rush | |
| 3,885,163 A | 5/1975 | Toberman | |
| 3,918,844 A | 11/1975 | Bailey | |
| 3,944,855 A | 3/1976 | Le Van | |
| 4,004,422 A | 1/1977 | Le Van | |
| 4,081,224 A | 3/1978 | Krupp | |
| 4,115,034 A | 9/1978 | Smith | |
| 4,130,064 A | 12/1978 | Bridwell | |
| 4,211,078 A | 7/1980 | Bass | |
| 4,212,598 A | 7/1980 | Roche et al. | |
| 4,228,360 A | 10/1980 | Navarro | |

(Continued)

FOREIGN PATENT DOCUMENTS

CH  1986/007504 A1  12/1986

OTHER PUBLICATIONS

Lee W. Young, International Search Report, PCT/US2009/066024 Apr. 2, 2010, p. 2, Alexandria, VA, US.

(Continued)

*Primary Examiner* — Michael Leslie
(74) *Attorney, Agent, or Firm* — Dresch IP Law, PLLC; John J. Dresch

(57) ABSTRACT

An adaptive, low-impact vehicle energy harvester system, and a method of harvesting vehicle energy, is provided. The system includes a plurality of channels disposed longitudinally in a trafficway, wherein each of the plurality of channels includes one or more compressible, elongated hollow bodies such that a movement of a vehicle along the trafficway causes contents in the elongated hollow bodies to be expelled from one end, a motor in communication with the hollow bodies such that the contents expelled from one end of the hollow bodies actuate the motor, and a control unit that varies a resistance to the movement of the contents in the elongated hollow bodies based on at least one of a mass of the vehicle, a velocity of the vehicle, and a rate of change of velocity of the vehicle.

19 Claims, 3 Drawing Sheets

(56) References Cited

U.S. PATENT DOCUMENTS

| | | | |
|---|---|---|---|
| 4,238,687 A | 12/1980 | Martinez | |
| 4,239,974 A | 12/1980 | Swander et al. | |
| 4,239,975 A | 12/1980 | Chiappetti | |
| 4,247,785 A | 1/1981 | Apgar | |
| 4,250,395 A | 2/1981 | Lundgren | |
| 4,322,673 A * | 3/1982 | Dukess | 417/229 |
| 4,339,920 A | 7/1982 | Le Van | |
| 4,409,489 A | 10/1983 | Hayes | |
| 4,418,542 A | 12/1983 | Ferrell | |
| 4,434,374 A | 2/1984 | Lundgren | |
| 4,437,015 A | 3/1984 | Rosenblum | |
| 4,614,875 A | 9/1986 | McGee | |
| 4,700,540 A | 10/1987 | Byrum | |
| 4,739,179 A | 4/1988 | Stites | |
| 4,912,995 A | 4/1990 | Otters | |
| 4,915,196 A | 4/1990 | Krisko | |
| 4,944,474 A | 7/1990 | Jones | |
| 4,980,572 A | 12/1990 | Sen | |
| 5,119,136 A | 6/1992 | Morikawa | |
| 5,157,922 A | 10/1992 | Baruch | |
| 5,250,769 A | 10/1993 | Moore | |
| 5,347,186 A | 9/1994 | Konotchick | |
| 5,355,674 A | 10/1994 | Rosenberg | |
| 5,449,909 A | 9/1995 | Kaiser et al. | |
| 5,634,774 A * | 6/1997 | Angel et al. | 417/229 |
| 5,648,645 A | 7/1997 | Arpagaus et al. | |
| 5,678,933 A | 10/1997 | Ouchi et al. | |
| 5,977,742 A | 11/1999 | Henmi | |
| 5,984,432 A | 11/1999 | Otomo et al. | |
| 6,023,134 A | 2/2000 | Carl et al. | |
| 6,091,159 A | 7/2000 | Galich | |
| 6,116,704 A | 9/2000 | Nakakita et al. | |
| 6,172,426 B1 | 1/2001 | Galich | |
| 6,204,568 B1 | 3/2001 | Runner | |
| 6,353,270 B1 | 3/2002 | Sen | |
| 6,362,534 B1 | 3/2002 | Kaufman | |
| 6,376,925 B1 * | 4/2002 | Galich | 290/1 R |
| 6,467,266 B1 | 10/2002 | Kanazawa et al. | |
| 6,494,144 B1 | 12/2002 | Perez Sanchez | |
| 6,662,099 B2 | 12/2003 | Knaian et al. | |
| 6,718,760 B1 * | 4/2004 | Padera | 60/398 |
| 6,734,575 B2 | 5/2004 | Ricketts | |
| 6,756,694 B2 | 6/2004 | Ricketts | |
| 6,767,161 B1 | 7/2004 | Calvo et al. | |
| 6,812,588 B1 | 11/2004 | Zadig | |
| 6,858,952 B2 | 2/2005 | Gott et al. | |
| 6,894,233 B2 | 5/2005 | Dingwall et al. | |
| 6,936,932 B2 | 8/2005 | Kenney | |
| 6,969,213 B2 | 11/2005 | Rastegar et al. | |
| 7,043,904 B2 | 5/2006 | Newman | |
| 7,067,932 B1 | 6/2006 | Ghassemi | |
| 7,102,244 B2 | 9/2006 | Hunter, Jr. | |
| 7,145,257 B2 | 12/2006 | Ricketts | |
| 7,148,581 B2 | 12/2006 | Hershey et al. | |
| 7,239,031 B2 | 7/2007 | Ricketts | |
| 7,315,088 B2 | 1/2008 | Erriu | |
| 7,371,030 B2 | 5/2008 | Hickman | |
| 2003/0132636 A1 | 7/2003 | Ricketts | |
| 2003/0151381 A1 | 8/2003 | Kadota et al. | |
| 2004/0066041 A1 | 4/2004 | Hunter, Jr. | |
| 2005/0116545 A1 | 6/2005 | Hamel et al. | |
| 2005/0143876 A1 | 6/2005 | Tanase | |
| 2005/0200132 A1 | 9/2005 | Kenney | |
| 2006/0152008 A1 | 7/2006 | Ghassemi | |
| 2006/0237968 A1 | 10/2006 | Chandrasekaran | |
| 2007/0018803 A1 | 1/2007 | Lang | |
| 2007/0085342 A1 | 4/2007 | Horianopoulos et al. | |
| 2007/0158945 A1 | 7/2007 | Annen et al. | |
| 2008/0224477 A1 | 9/2008 | Kenney | |

OTHER PUBLICATIONS

Blaine R. Copenheaver, International Search Report, PCT/US2009/066025 Mar. 10, 2010, p. 2, Alexandria, VA, US.

Lee W. Young, International Search Report, PCT/US2010/022287 Jun. 1, 2010, p. 2, Alexandria, VA, US.

Blaine R. Copenheaver, International Search Report, PCT/US2010/022288 Jul. 12, 2010, p. 2, Alexandria, VA, US.

Lee W. Young, International Search Report, PCT/US2010/022289 Jun. 1, 2010, p. 2, Alexandria, VA, US.

Lee W. Young, International Search Report, PCT/US2010/022291 Jun. 15, 2010, p. 2, Alexandria, VA, US.

Blaine R. Copenheaver, International Search Report, PCT/US2010/022294 Jun. 28, 2010, p. 2, Alexandria, VA, US.

Blaine R. Copenheaver, International Search Report, PCT/US2010/022296 Jul. 29, 2010, p. 2, Alexandria, VA, US.

Lee W. Young, International Search Report, PCT/US2010/020676 Jun. 15, 2010, p. 2, Alexandria, VA, US.

* cited by examiner

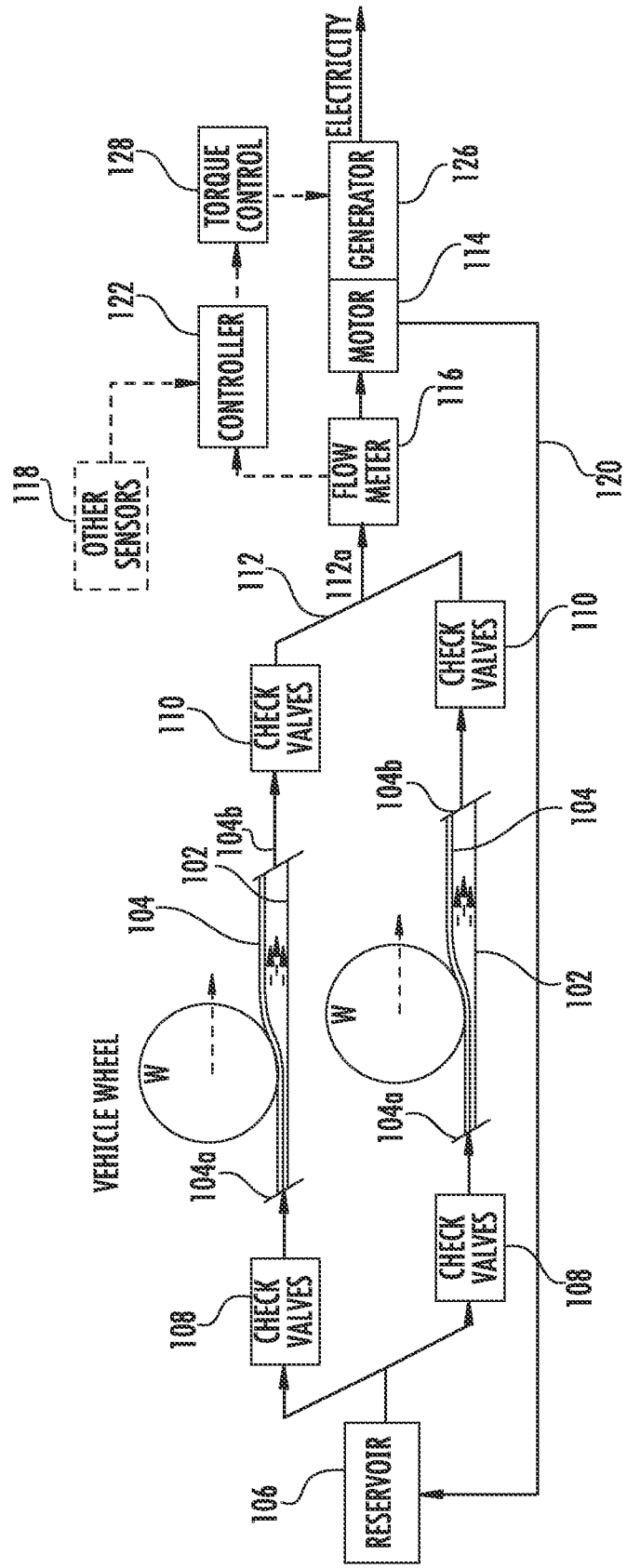

ADAPTIVE, LOW-IMPACT VEHICLE ENERGY HARVESTER

CROSS-REFERENCE TO RELATED APPLICATIONS

The present invention claims the benefit of U.S. Provisional Patent Application No. 61/118,339, filed Nov. 26, 2008, and entitled "ADAPTIVE, LOW-IMPACT VEHICLE ENERGY HARVESTER", and U.S. Provisional Patent Application No. 61/118,334, filed Nov. 26, 2008, and entitled "ADAPTIVE VEHICLE ENERGY HARVESTER", the entire contents of which are incorporated herein by reference in their entirety.

FIELD OF THE INVENTION

The present invention is directed toward devices and methods of harvesting vehicle energy, and more specifically, toward an adaptive, low-impact vehicle energy harvester and a methods of adaptively harvesting vehicle energy.

BACKGROUND OF THE INVENTION

Very few devices that capture energy from passing vehicles have been implemented, despite numerous designs put forth by various parties over the years. Issues of efficiency, reliability, and manufacturability, among others, have limited the practicality of vehicle energy harvesting devices. Added to the challenge is the variability of vehicle sizes, speeds, axle configurations, and lane positions, all of which can greatly influence the operation of a device trying to capture energy from vehicles and convert it into a useful form of power.

Therefore, a need exists for an energy capture device and method having improved efficiency, reliability, and manufacturability, as well as practicality. A need also exists for an energy capture device and method that takes into account the variability of vehicle sizes, speeds, axle configurations, and/or lane positions in converting vehicle energy into a useful form of power.

SUMMARY OF THE INVENTION

These problems and others are addressed by the present invention, which provides a novel vehicle energy harvester that overcomes many of the issues with the conventional devices and is therefore better suited for real-world implementation than the conventional art.

An exemplary embodiment of the invention is directed to a system for converting energy of a moving vehicle into a useful form, the system comprising one or more compressible, elongated hollow bodies configured to be disposed longitudinally on or in a trafficway such that a movement of a vehicle along said trafficway causes contents in said elongated hollow bodies to be expelled from one end; a motor in communication with said hollow bodies such that said contents expelled from one end of said hollow bodies actuates said motor; a control unit that varies a resistance to the movement of said contents in said elongated hollow bodies based on at least one of: i. a mass of the vehicle, ii. a velocity of the vehicle, and iii. a rate of change of velocity of the vehicle.

An exemplary embodiment of the invention is directed to a method of converting energy of a moving vehicle into a useful form, the method comprising actuating a motor, which is in communication with a compressible, elongated hollow body disposed on or in a trafficway, using contents expelled from one end of said compressible, elongated hollow body by a movement of a vehicle along the trafficway; and varying a resistance to the movement of said contents in said compressible, elongated hollow body based on at least one of: i. a mass of the vehicle, ii. a velocity of the vehicle, and iii. a rate of change of velocity of the vehicle.

An exemplary embodiment of the invention is directed to a system for converting energy of a moving vehicle into a useful form, the system comprising: a. one or more compressible, elongated hollow bodies configured to be disposed longitudinally on or in a trafficway such that a movement of a vehicle along said trafficway causes contents in said elongated hollow bodies to be expelled from one end; b. a motor in communication with said hollow bodies such that said contents expelled from one end of said hollow bodies actuates said motor; and c. one or more means for varying a resistance to the movement of said contents in said elongated hollow bodies based on at least one of: i. a mass of the vehicle, ii. a velocity of the vehicle, and iii. a rate of change of velocity of the vehicle.

An exemplary embodiment of the invention is directed to a system for converting the energy of a moving vehicle into a useful form, wherein the interaction of a moving vehicle with a means for capturing energy causes a flow through said means for capturing energy, and said flow is retarded by a variable amount at least in part according to at least one of: i. a mass of the vehicle, ii. a velocity of the vehicle, and iii. a rate of change of velocity of the vehicle.

An exemplary embodiment of the invention is directed to a system for converting energy of a moving vehicle into a useful form, wherein an interaction of a moving vehicle with a device for capturing energy causes a flow through said device for capturing energy, and said flow is retarded by a variable amount at least in part according to at least one of: i. a mass of the vehicle, ii. a velocity of the vehicle, and iii. a rate of change of velocity of the vehicle.

An exemplary embodiment of the invention is directed to a method of converting the energy of a moving vehicle into a useful form, the method comprising causing a flow through an energy capture device based on an interaction of a moving vehicle with the energy capture device, wherein the flow is retarded by a variable amount at least in part according to at least one of: i. a mass of the vehicle, ii. a velocity of the vehicle, and iii. a rate of change of velocity of the vehicle.

An exemplary embodiment of the invention is directed to a system for converting energy of a moving vehicle into a useful form, the system comprising: a. two channels disposed longitudinally in a trafficway, each containing one or more compressible, elongated hollow bodies such that the movement of a vehicle along said trafficway causes contents in said elongated hollow bodies to be expelled from one end; b. a motor in communication with said hollow bodies such that said contents expelled from said hollow bodies actuates said motor; c. one or more means of measuring directly or indirectly at least one of: i. a mass of the vehicle, ii. a velocity of the vehicle, and iii. a rate of change of velocity of the vehicle; and d. one or more means for varying a resistance to the movement of said contents in said elongated hollow bodies based on said means of measuring.

An exemplary embodiment of the invention is directed to a system for converting the energy of a moving vehicle into a useful form, wherein the interaction of a moving vehicle with a means for capturing energy causes a flow through said means for capturing energy, and said flow is retarded by a variable amount at least in part according to one or more means of measuring directly or indirectly at least one of: i. a mass of the vehicle, ii. a velocity of the vehicle, and iii. a rate of change of velocity of the vehicle.

An exemplary embodiment of the invention is directed to a system for converting energy of a moving vehicle into a useful form, the system comprising: a plurality of channels disposed longitudinally on or in a trafficway, wherein each of the plurality of channels includes one or more compressible, elongated hollow bodies such that a movement of a vehicle along said trafficway causes contents in said elongated hollow bodies to be expelled from one end; a motor in communication with said hollow bodies such that said contents expelled from one end of said hollow bodies actuates said motor; a first unit that measures directly or indirectly at least one of: i. a mass of the vehicle, ii. a velocity of the vehicle, and iii. a rate of change of velocity of the vehicle; and a second unit that varies a resistance to the movement of said contents in said elongated hollow bodies based on measurements by said first unit.

An exemplary embodiment of the invention is directed to a method of converting energy of a moving vehicle into a useful form, the method comprising: actuating a motor, which is in communication with a compressible, elongated hollow body disposed on or in a trafficway, using contents expelled from one end of said compressible, elongated hollow body by a movement of a vehicle along the trafficway; measuring directly or indirectly at least one of: i. a mass of the vehicle, ii. a velocity of the vehicle, and iii. a rate of change of velocity of the vehicle; and varying a resistance to the movement of said contents in said compressible, elongated hollow body based on the measuring.

An exemplary embodiment of the invention is directed to a system for converting energy of a moving vehicle into a useful form, wherein an interaction of a moving vehicle with a device for capturing energy causes a flow through said device for capturing energy, and said flow is retarded by a variable amount at least in part according to a measuring unit that measures directly or indirectly at least one of: i. a mass of the vehicle, ii. a velocity of the vehicle, and iii. a rate of change of velocity of the vehicle.

An exemplary embodiment of the invention is directed to a method of converting the energy of a moving vehicle into a useful form, the method comprising: causing a flow through a energy capturing device based on an interaction of a moving vehicle with the energy capturing device, wherein the flow is retarded by a variable amount at least in part according to one or more means of measuring directly or indirectly at least one of: i. a mass of the vehicle, ii. a velocity of the vehicle, and iii. a rate of change of velocity of the vehicle.

BRIEF DESCRIPTION OF THE DRAWINGS

These and other aspects and features of embodiments of the present invention will be better understood after a reading of the following detailed description, together with the attached drawings, wherein:

FIG. 3 is a schematic illustrating a vehicle energy harvester according to another exemplary embodiment of the invention.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
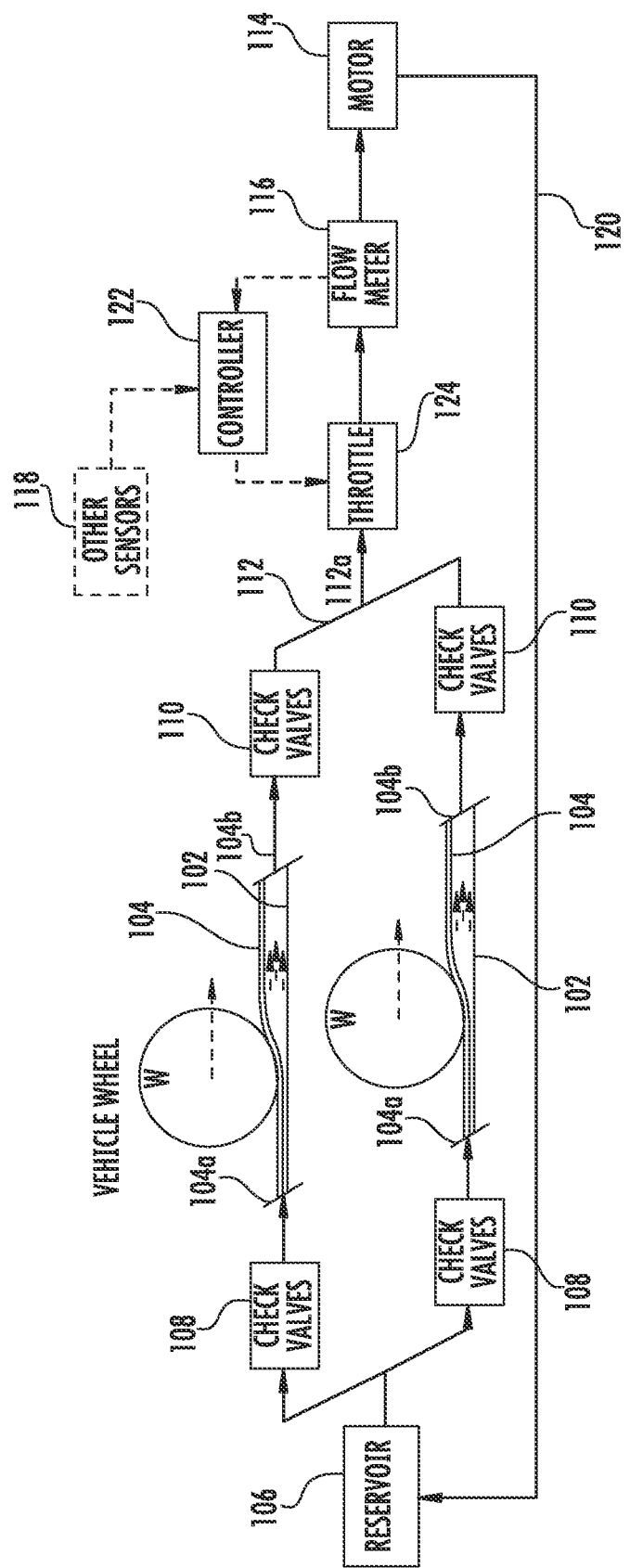
FIG. 1 is a schematic illustrating a vehicle energy harvester according to an exemplary embodiment of the invention.
Figure 2:
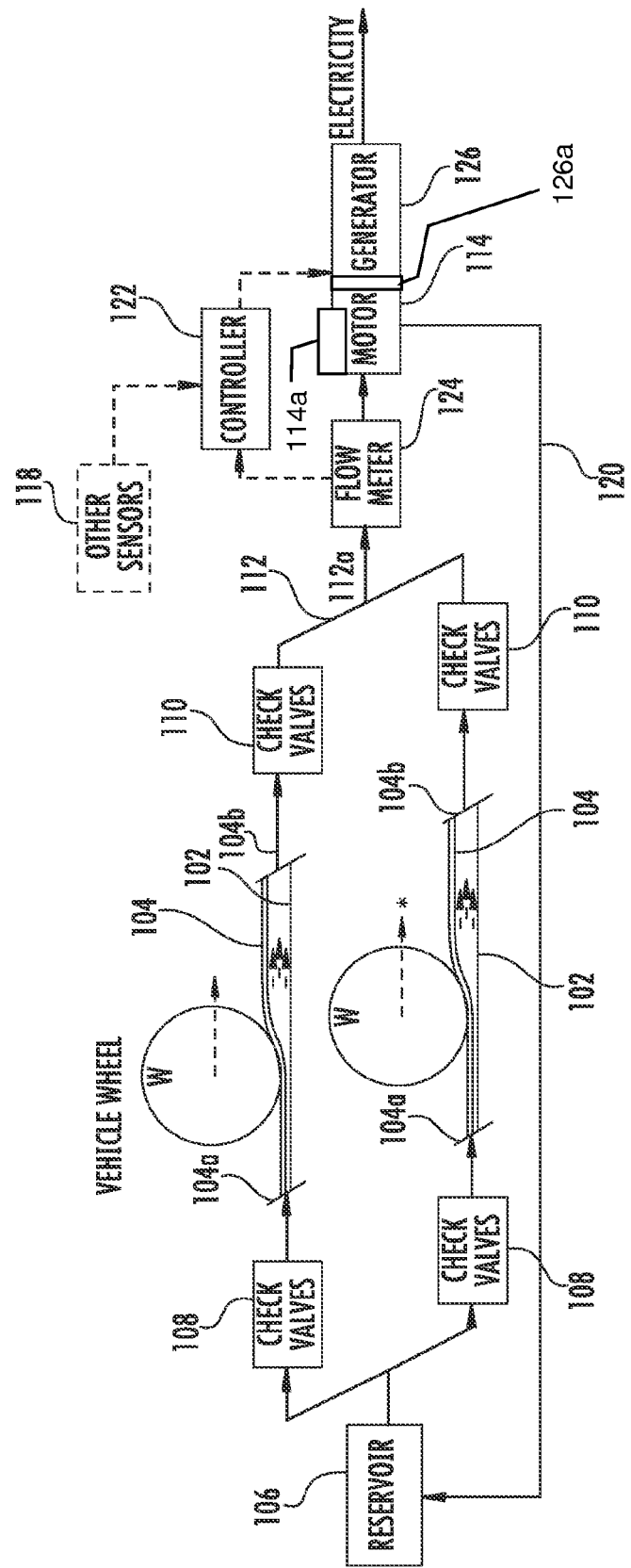
FIG. 2 is a schematic illustrating a vehicle energy harvester according to another exemplary embodiment of the invention.

Referring now to the drawings, FIGS. 1-3 illustrate exemplary embodiments of a vehicle energy harvester.

With reference to FIGS. 1-3, an exemplary embodiment of the vehicle energy harvester 100 includes two channels 102 disposed longitudinally in a roadway that contain a number of resilient hydraulic lines 104. The channels 102 can be deep enough that a resilient, durable cover may be placed over each set of lines 104 and have a top surface just below the surface of the greater roadway. Dividing the hydraulic lines 104 into two sets near either edge of a lane minimizes the contact area between the resilient, durable cover and potentially damaging road equipment such as street cleaners and snow plows. Instead, a conventional pavement surface between the channels largely supports those equipment loads. The lines 104 are connected to a pressurized fluid reservoir 106 through check valves 108 at the line inlets 104a. Another set of check valves 110 at the line outlets 104b connect the lines 104 to a fluid manifold 112 with a single outlet 112a. The outlet 112a communicates with a hydraulic motor 114. The outlet 112a may also communicate with an inline flow meter 116 or other sensors 118. A hydraulic line 120 provides a return from the hydraulic motor 114 to the fluid reservoir 106.

During operation of an embodiment, each wheel W on a vehicle of appropriate size will depress the resilient cover and collapse a portion of hydraulic lines 104 underneath. As each wheel W continues to roll along, a volume of fluid in the line 104 will be forced to flow along the line 104 and towards the hydraulic motor 114. The interaction between wheel W and resilient cover will impart a reaction force on the wheel W, which will have a horizontal component that will act to slow the wheel's translation. As forces act on each of the wheels W, the vehicle as a whole will slow down, corresponding to the energy that has been drawn from the vehicle by the energy harvesting device. The energy transferred to the flowing pressurized fluid may be stored in an accumulator (not shown) for later use or converted through the hydraulic motor 114 to another form such as electricity.

In another embodiment, the vehicle energy harvester 100 can adjust the reaction force imparted on an incident vehicle in response to the motion characteristics of that vehicle.

For example, the energy harvester 100 may include a flow meter 116 at the outlet 112a of hydraulic line manifold 112, as shown in FIGS. 2 and 3. The vehicle energy harvester 100 can monitor this flow meter 116 over time and, from it, approximate the speed and acceleration or deceleration of a vehicle as it interacts with the vehicle energy harvester 100, for example, using controller 122. If a vehicle is massive enough that its reaction force with the energy harvester 100 slows the vehicle far less than it safely could, the vehicle energy harvester 100 may increase its resistance to the vehicle's motion until it reaches an operational or safety limit. Similarly, if a less massive vehicle encounters the energy harvester 100 and begins to decelerate too quickly, the energy harvester 100 may decrease the resistance presented to the vehicle. In one embodiment, the vehicle energy harvester 100 resistance is varied using a throttle 124 that restricts fluid flow from the resilient lines 104 by an adjustable amount.

In another embodiment, for example, as illustrated in FIG. 3, the hydraulic motor 114 is connected to a separately-excited generator 126 with torque control 128. The vehicle energy harvester 100 adjusts the back torque of the generator 126 in response to the flow meter 116 or other signals, which alters fluid flow through the hydraulic motor 114 and thereby varies the reacting force against the wheels W of a vehicle.

In another embodiment, for example, as illustrated in FIG. 2, a generator 126 is coupled to the hydraulic motor 114 through a continuously variable transmission 126a (CVT). Higher CVT ratios cause the generator 126 to spin faster for a given flow rate in the resilient tubes 104, producing more back torque to resist the flow of fluid through the tubes 104. The energy harvester 100 may vary the CVT ratio, and therefore harvester resistance to motion, based on measures such as flow rate or direct vehicle speed or mass. Alternatively, the vehicle energy harvester 100 may vary generator speed per flow rate by altering a variable displacement hydraulic pump 114a that drives the generator 126.

In another exemplary embodiment, if the energy harvester's resistance to vehicle motion becomes sufficient, one or more vehicle wheels W may climb their corresponding depressions in their resilient tubes 104 and cease to transfer meaningful energy to the harvesting device 100. In that case, the energy harvester 100 may sense a diminished flow rate and reduce the resistance to fluid flow until the wheels W depress the tubes 104 once more and fluid flow rate increases to an appropriate amount.

In applications where safe speed regulation may be a concern, the vehicle energy harvester 100 can adjust its resistance to help ensure that a vehicle departs the device at a safe speed. In such cases, the vehicle energy harvester 100 may use measures like flow rate to determine the necessary deceleration required to slow a vehicle to a target speed. That deceleration may be limited to a configurable value deemed safe for the vehicle and its occupants.

The exemplary embodiments provide advantages beyond its potential adaptability. Whereas many conventional vehicle energy harvesters employ a number of interaction points between vehicle and device, exemplary embodiments of the present invention interact continuously with a vehicle during the period of energy capture and conversion. The principal benefit is that with the embodiments of the present invention, a vehicle is not subject to repeated impact events that could disrupt the comfort of an operator or their control over their vehicle. Moreover, the vehicle energy harvester 100 can gradually capture the energy of a vehicle over an extended period, converting more energy into useful power than devices that rely on a series of brief vehicle-device interactions.

As described, an exemplary embodiment requires no above-surface structures in the roadway, which not only reduces the risk to small vehicles such as motorcycles but also minimizes the likelihood that drivers will react to the system by applying their brakes or attempting evasive maneuvers. Furthermore, another exemplary embodiment provides a closed, sealed system, making it far more impervious to road debris, ice, snow, etc.

For example, an exemplary embodiment is directed to a system for converting the energy of a moving vehicle into a useful form, comprising:
   a. two channels 102 disposed longitudinally in a trafficway, each containing one or more compressible, elongated hollow bodies 104 such that the movement of a vehicle along said trafficway causes the contents in said elongated hollow bodies 104 to be expelled from one end,
   b. a motor 114 in communication with said hollow bodies 104 such that said contents expelled from one end of said hollow bodies 104 actuates said motor 114,
   c. one or more means (e.g., throttle 124, flow meter 116, controller 122, and/or other sensors 118; flow meter 116, motor 114, generator 126, controller 122, and/or other sensors 118; or flow meter 116, motor 114, generator 126, torque control 128, controller 122, and/or other sensors 118) for varying a resistance to the movement of said contents in said elongated hollow bodies 104 based on:
      i. a mass of the vehicle,
      ii. a velocity (or speed) of the vehicle, and
      iii. a rate of change of velocity of the vehicle (i.e., acceleration or deceleration).

Another exemplary embodiment is directed to a means (e.g., 100) for converting the energy of a moving vehicle into a useful form, wherein the interaction of a moving vehicle with a means for capturing energy causes a flow through said means for capturing energy, and said flow is retarded by a variable amount at least in part according to at least one of:
   i. a mass of the vehicle,
   ii. a velocity (or speed) of the vehicle, and
   iii. a rate of change of velocity of the vehicle.

The embodiments provide an energy capture device 100 and method having improved efficiency, reliability, and manufacturability, as well as practicality. The exemplary energy capture device 100 and method takes into account the variability of vehicle sizes, speeds, axle configurations, and lane positions in converting the captured motion energy of vehicles into a useful form of energy.

In some exemplary embodiments, the vehicle energy harvester 100 or harvester controller 122 may determine or calculate one or more of, for example, the speed or velocity of a vehicle, the rate of change of velocity over time (i.e., the acceleration or deceleration) of a vehicle, the direct or indirect measure of a mass of a vehicle, etc. In other exemplary embodiments, the vehicle energy harvester 100 or harvester controller 122 may receive as an input one or more of, for example, the speed or velocity of a vehicle, the acceleration or deceleration of a vehicle, the direct or indirect measure of a mass of a vehicle, etc., for example, from other sensors 118. These sensors 118 can include one or more conventional sensors for detecting the speed or velocity of a vehicle, the acceleration or deceleration of a vehicle, the direct or indirect measure of a mass of a vehicle, etc.

Another exemplary embodiment is directed to a system for converting the energy of a moving vehicle into a useful form, comprising:
   a. two channels 102 disposed longitudinally in a trafficway, each containing one or more compressible, elongated hollow bodies 104 such that the movement of a vehicle along said trafficway causes the contents in said elongated hollow bodies 104 to be expelled from one end,
   b. a motor 114 in communication with said hollow bodies 104 such that said contents expelled from one end of said hollow bodies 104 actuates said motor 114,
   c. one or more means (e.g., other sensors 118) of measuring directly or indirectly at least one of:
      i. a mass of the vehicle,
      ii. a velocity (or speed) of the vehicle, and
      iii. a rate of change of velocity of the vehicle, and
   d. one or more means (e.g., throttle 124, flow meter 116, and/or controller 122; flow meter 116, motor 114, generator 126, and/or controller 122; or flow meter 116, motor 114, generator 126, torque control 128, and/or controller 122) for varying a resistance to the movement of said contents in said elongated hollow bodies 104 based on said means of measuring.

Another exemplary embodiment is directed to a means (e.g., 100) for converting the energy of a moving vehicle into a useful form, wherein the interaction of a moving vehicle with the means for capturing energy causes a flow through said means for capturing energy, and said flow is restricted by a variable amount at least in part according to one or more means (e.g., other sensors 118) of measuring directly or indirectly at least one of:

i. a mass of the vehicle,
　　ii. a velocity of the vehicle, and
　　iii. a rate of change of velocity of the vehicle.

The embodiments provide an energy capture device and method having improved efficiency, reliability, and manufacturability, as well as practicality. The exemplary energy capture device and method takes into account the variability of vehicle sizes, speeds, axle configurations, and lane positions in converting the captured motion energy of vehicles into a useful form of energy. The embodiments of the present invention also provide an ability to monitor or regulate the speed of moving vehicles.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for controlling the measuring, either directly or indirectly, of at least one of a mass of the vehicle, a velocity of the vehicle, and a rate of change of velocity of the vehicle; and varying a resistance to a movement of the contents in the compressible, elongated hollow body based on the measuring. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A system for converting energy of a moving vehicle into useful power, the system comprising:
   one or more compressible, elongated hollow bodies configured to be disposed longitudinally on or in a trafficway such that a movement of a vehicle along said trafficway causes contents in said elongated hollow bodies to be expelled from one end, the one or more compressible, elongated hollow bodies having a length in the direction of vehicle travel and a width in the direction transverse to the direction of vehicle travel;
   a motor in communication with said hollow bodies such that said contents expelled from one end of said hollow bodies actuates said motor; and
   a control unit programmed to control a deceleration of the vehicle as the vehicle travels over the one or more compressible, elongated hollow bodies by varying a resistance to a movement of said contents in said elongated hollow bodies based on at least one of a mass of the vehicle, a velocity of the vehicle, and a rate of change of velocity of the vehicle.

2. The system of claim 1, wherein the control unit measures the at least one of the mass of the vehicle, the velocity of the vehicle, and the rate of change of velocity of the vehicle.

3. The system of claim 1, wherein the control unit receives a signal from a sensor that measures the at least one of the mass of the vehicle, the velocity of the vehicle, and the rate of change of velocity of the vehicle.

4. The system of claim 1, wherein the control unit includes a flow meter in communication with said elongated hollow bodies.

5. The system of claim 1, comprising:
   a pressurized fluid reservoir in communication with one or more of said elongated bodies.

6. The system of claim 4, wherein the control unit includes a controller coupled to at least one of the flow meter and a flow control device.

7. The system of claim 6, wherein the flow control device is a throttle.

8. The system of claim 6, wherein the flow control device is a variable displacement pump.

9. The system of claim 6, wherein the flow control device is a variable transmission.

10. The system of claim 6, wherein the flow control device is a torque control unit.

11. A system for converting energy of a moving vehicle into a useful form, the system comprising:
    one or more compressible, elongated hollow bodies configured to be disposed longitudinally on or in a trafficway such that a movement of a vehicle along said trafficway causes contents in said elongated hollow bodies to be expelled from one end;
    a motor in communication with said hollow bodies such that said contents expelled from one end of said hollow bodies actuate said motor; and
    means for controlling a deceleration of the vehicle as the vehicle travels over the one or more compressible, elongated hollow bodies by varying a resistance to a movement of said contents in said elongated hollow bodies based on at least one of a mass of the vehicle, a velocity of the vehicle, and a rate of change of velocity of the vehicle.

12. The system of claim 1, wherein the control unit includes:
    a flow meter in communication with said elongated hollow bodies; and
    a flow control device,
    wherein the control unit is programmed to determine a necessary deceleration of the vehicle required to slow the vehicle to a target velocity based on a flow rate of the contents in the one or more compressible, elongated hollow bodies detected by the flow meter, and
    wherein the control unit is programmed to control the necessary deceleration of the vehicle as the vehicle travels over the one or more compressible, elongated hollow bodies by varying the resistance to the movement of the contents in the elongated hollow bodies using the flow control device.

13. The system of claim 1, wherein the control unit includes:
    a flow meter in communication with said elongated hollow bodies,
    wherein the control unit is programmed to control the deceleration of the vehicle as the vehicle travels over the one or more compressible, elongated hollow bodies based on a flow rate of the contents in the one or more compressible, elongated hollow bodies detected by the flow meter.

14. The system of claim 11, comprising:
    means for measuring at least one of the mass of the vehicle, the velocity of the vehicle, and the rate of change of velocity of the vehicle.

15. The system of claim 14, wherein the means for measuring directly measures the at least one of the mass of the vehicle, the velocity of the vehicle, and the rate of change of velocity of the vehicle.

16. The system of claim 14, wherein the means for measuring indirectly measures the at least one of the mass of the vehicle, the velocity of the vehicle, and the rate of change of velocity of the vehicle.

17. A system for converting energy of a moving vehicle into a useful form, the system comprising:
    a plurality of channels disposed longitudinally on or in a trafficway, wherein each of the plurality of channels includes one or more compressible, elongated hollow bodies such that a movement of a vehicle along said trafficway causes contents in said elongated hollow bodies to be expelled from one end;

a motor in communication with said hollow bodies such that said contents expelled from one end of said hollow bodies actuate said motor;

a first unit that receives directly or indirectly a measure of at least one of a mass of the vehicle, a velocity of the vehicle, and a rate of change of velocity of the vehicle; and a second unit programmed to control a deceleration of the vehicle as the vehicle travels over the one or more compressible, elongated hollow bodies by varying a resistance to a movement of said contents in said elongated hollow bodies based on a signal by said first unit.

18. A method of converting energy of a moving vehicle into a useful form, the method comprising:

actuating a motor, which is in communication with a compressible, elongated hollow body disposed on or in a trafficway, using contents expelled from one end of the compressible, elongated hollow body by a movement of a vehicle along the trafficway; and controlling a deceleration of the vehicle as the vehicle travels over the compressible, elongated hollow body by varying a resistance to a movement of the contents in the compressible, elongated hollow body based on at least one of a mass of the vehicle, a velocity of the vehicle, and a rate of change of velocity of the vehicle.

19. A method of converting energy of a moving vehicle into a useful form, the method comprising:

actuating a motor, which is in communication with a compressible, elongated hollow body disposed on or in a trafficway, using contents expelled from one end of the compressible, elongated hollow body by a movement of a vehicle along the trafficway;

measuring directly or indirectly at least one of a mass of the vehicle, a velocity of the vehicle, and a rate of change of velocity of the vehicle; and controlling a deceleration of the vehicle as the vehicle travels over the compressible, elongated hollow body by varying a resistance to a movement of the contents in the compressible, elongated hollow body based on the measuring.

* * * * *